(12) United States Patent
Lin

(10) Patent No.: US 8,228,766 B2
(45) Date of Patent: *Jul. 24, 2012

(54) METHOD AND APPARATUS FOR CONTROLLING DATA ACCESS RATE OF AN OPTICAL DISC DRIVER

(75) Inventor: Hui-Chih Lin, Hsin-Tien (TW)

(73) Assignee: Tian Holdings, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/773,198

(22) Filed: May 4, 2010

(65) Prior Publication Data

US 2011/0002200 A1   Jan. 6, 2011

Related U.S. Application Data

(63) Continuation of application No. 10/906,739, filed on Mar. 3, 2005, now Pat. No. 7,710,836.

(30) Foreign Application Priority Data

Mar. 3, 2004  (TW) ................................ 93105617 A

(51) Int. Cl.
*G11B 21/08* (2006.01)
(52) U.S. Cl. ................. 369/30.4; 369/30.05; 369/47.38; 369/47.43
(58) Field of Classification Search .................. None
See application file for complete search history.

(56) References Cited

U.S. PATENT DOCUMENTS

| | | | |
|---|---|---|---|
| 6,603,719 B1 | 8/2003 | Wu | |
| 6,834,032 B2 | 12/2004 | Kim | |
| 7,301,867 B2 | 11/2007 | Bahng | |
| 7,710,836 B2 * | 5/2010 | Lin | 369/30.04 |
| 2004/0141440 A1 | 7/2004 | Lee et al. | |
| 2005/0007918 A1 * | 1/2005 | Tokudome et al. | 369/47.36 |
| 2005/0145008 A1 | 7/2005 | Vanderveen et al. | |
| 2005/0195694 A1 | 9/2005 | Lin | |
| 2011/0002200 A1 * | 1/2011 | Lin | 369/30.04 |

FOREIGN PATENT DOCUMENTS

| | | |
|---|---|---|
| CN | 1385852 A | 12/2002 |
| JP | 2003281815 A | 10/2003 |
| TW | 388024 B | 4/2000 |
| TW | 452760 B | 9/2001 |
| TW | 200414131 | 8/2004 |

\* cited by examiner

*Primary Examiner* — Joseph Feild
*Assistant Examiner* — Ifedayo Iluyomade
(74) *Attorney, Agent, or Firm* — Perkins Coie LLP

(57) ABSTRACT

A method and an apparatus for controlling data access rate of an optical disc player are disclosed. The method includes steps of (1) utilizing a micro-controller to decide whether an action of an instruction of a predetermined data processing is an extraction operation or a play operation; (2) driving the spindle motor and a pick-up head to retrieve data from an optical disc at a first data access rate by the micro-controller while the action of the instruction of the predetermined data processing is an extraction operation; and (3) driving the spindle speed and the pick-up head to retrieve data from the optical disc at a second data access rate which is less than the first data access rate by the micro-controller while the action of the instruction of the predetermined data processing is a play operation.

11 Claims, 8 Drawing Sheets

METHOD AND APPARATUS FOR CONTROLLING DATA ACCESS RATE OF AN OPTICAL DISC DRIVER

CROSS-REFERENCES TO RELATED APPLICATIONS

This application is a Continuation application of commonly assigned U.S. patent application Ser. No. 10/906,739, filed on Mar. 3, 2005 now U.S. Pat. No. 7,710,836, and entitled "METHOD AND APPARATUS FOR CONTROLLING DATA ACCESS RATE OF AN OPTICAL DISC DRIVER," which is hereby incorporated herein in its entirety by reference.

BACKGROUND OF INVENTION

1. Field of the Invention

This invention relates to a method for controlling an optical disc player. Specifically, it relates to a method for controlling data accessing rate of the optical disc player.

2. Description of the Prior Art

The management and storage of documents is very important for a company or an individual. In the past, most data record on the paper. It is inconvenient, especially a great deal of data, large volume and heavy weight. Now, the digital data is utilized and stored generally in the storage media of a computer. A variety of storage media are born in order to convenience of storing digital data of user, for example, an optical disc. It is cheap, small size, and a large volume. Therefore, it makes user store data conveniently by recording them on the optical disc.

Besides text data and program data, the optical disc is generally used to store multimedia data, for example, audio stream or video stream, and an optical disc player is used to retrieve the data from the optical disc. FIG. 1 is a schematic diagram of an optical disc player system 10 according to the prior art. The optical disc player system 10 includes a micro-controller 11, a servo circuit 12, a motor driving circuit 14, a spindle motor 16, a track controlling circuit 18, a pick-up head 20, an optical disc 22, a non-volatile memory 24 stored a firmware, and a DRAM 26. The micro-controller 11 receives instructions inputted from a computer system to control operation of the optical disc player system 10, and manage operations of the motor driving circuit 14, the track controlling circuit 18, and the pick-up head 20 via the servo circuit 12. The micro-controller 11 also receives source data retrieved by the pick-up head 20, and feedback the digital data to a host 99 via the DRAM 26 as a buffer after decoding the source data. The motor driving circuit 14 controls the rotation speed of the spindle motor 16 to drive rotation of the optical disc 22. The track controlling circuit 18 controls the pick-up head 20 to retrieve the data from the track of the optical disc 22, that is the track controlling circuit 18 controls the pick-up head 20 to progress track seeking and track locking. In addition, the optical disc 22 is a kind of pure data disc, audio disc recording music, or video disc recoding image and music. Generally, the micro-controller 11 comprises a microprocessor for executing a firmware stored in the non-volatile memory 24. In some optical disc player system, the micro-controller 11 further comprises a digital data processor (DSP) cooperated with the microprocessor to enhance the performance of the micro-controller 11. Therefore, the host 99 only sends high-level control commands to the micro-controller 11 of the optical disc player system 10, and the micro-controller 11 executes the corresponding firmware to control operation of the optical disc player system 10 according to the control commands. For instance, when the host 99 needs the data of the optical disc 22, only needs to send an instruction of data processing and assign the address of the data. The micro-controller 11 executes the corresponding firmware of the optical disc player system 10 to achieve the object of data retrieving of the host 99 through operations (such as reach of a particular rotation speed of the spindle motor 16, moving and track locking of the pick-up head 20, and receiving the reflection of the laser from the optical disc 22) of the servo circuit 12, the spindle motor 16, the track controlling circuit 18, and the pick-up head 20.

FIG. 2. is a flow chart of the optical disc 22 retrieved by the optical disc player system 10 shown in FIG. 1. After power on, the micro-controller 11 initials and enters a main function 100; the optical disc player 10 is enabled at this time and is ready to retrieve the optical disc 22, comprising the steps of:

Step 102: receiving instructions inputted from the host 99.

Step 104: judging which type of the instructions received from the host 99; runs step 106 while the instructions are instructions of data processing; runs step 110 while the instructions are others instructions.

Step 106: controlling the motor driving circuit 14 via the servo circuit 12 to drive the spindle motor 16 and set a rotation speed.

Step 108: controlling the track controlling circuit 18 via the servo circuit 12 to drive the pick-up head 20 to retrieve data from a predetermined track; run step 102 while finish this step.

Step 110: executing corresponding action of the instructions; run step 102 while finish.

An application program will transmit the instructions of data accessing to the optical disc player 10 to retrieve data from the optical disc 22 when the user executes the application program and intend to get the data from the optical disc 22. For the video disc, the user utilizes the application program to extract data from the optical disc 22, for example, copy the data and store the data in a hard-disc player of the computer. When the micro-controller 11 of the optical disc player system 10 receives the instructions of data accessing transmitted by the application program, the micro-controller 11 executes the instructions of data accessing according to the firmware to control the motor driving circuit 14, the track controlling circuit 18 and the pick-up head 20. The motor driving circuit 14 drives the spindle motor 16 to set a rotation speed (ex. 10,000 rad/min), the track controlling circuit 18 drives the pick-up head 20 to operate the track seeking and track locking on this optical disc, the pick-up head 20 retrieves the data from the predetermined track of the optical disc 22 and feedbacks the data to the application program of the computer. Therefore, the application program stores the data retrieved from the optical disc 22 into the hard-disc player.

The spindle motor 16 drives corresponding spindle from a static status to a maximum speed supported by the optical disc player system 10 when the motor driving circuit 14 enables the spindle motor 16. For example, the maximum speed of the spindle of a 50× optical disc player tends to 10,000 radians per minute. However, the disc runout of the optical disc 22 will cause vibration and track locking of the pick-up head 20 under high speed rotation, that is easy to get error bits or the pick-up head 20 can not retrieve the data from the optical disc 22 smoothly. Therefore, the micro-controller 11 controls the spindle motor driving circuit 14 via a servo circuit 12 to slow the rotation speed of the spindle motor 16 down, for instance, from 10,000 radian/min to 8,000 radian/min. At this time, the pick-up header will retrieve the data of the optical disc 22 again. When the job of retrieving the data of the optical disc 22 is finished, the micro-controller 11 controls the spindle motor driving circuit 14 via a servo circuit 12 to recovery the rotation speed of the spindle motor 16 to 10,000 radian/min. In other words, the slowdown of the spindle makes a lower rotation speed of the optical disc 22 and a higher successful rate of retrieving data from the optical disc 22 for completing the operation of data accessing.

Considering the user utilizes the application program to play the video data of the optical disc 22, that is, the application program decodes the video data to play on the monitor and speakers equipped in a computer. First, the digital data of the optical disc 22 are read and stored in the computer for playing by media devices or application programs. The application program can also send commands instructions of data extraction (for example, read 10, read 12, read CD, or read CD MSF) to the optical disc player system 10 for data extraction. In the view of the optical disc player system 10, the procedure of data extraction is the same as the steps of copying video data and storing the data in a hard-disk drive. Generally speaking, the retrieving speed of extraction action is higher than the speed of playing action of the optical disc 22. Therefore, the optical disc player 10 has a DRAM 26 as a buffer for storing the data temporarily and the servo circuit 12 can provide the data stored in the buffer to the application program when the pick-up head 20 can't retrieve the data from the optical disc 22.

In one case of playing the video data of the optical disc 22, for some reason, such as low-quality optical disc and the serious vibration of the spindle motor 16, will cause transition of the spindle motor 16 between higher spindle speed and lower spindle speed. The transition results in more and more power consumption. Moreover, the micro-controller 11 wastes time to identify data and results in the image delay or some kind mosaic of the image on the screen.

Similarly, the transition also affects the operation of playing the audio data on the optical disc 22. For example, the user can utilize the application program to extract audio data from the optical disc 22 and store the audio file in the Hard-Disk Besides, and the user also can utilize the application program to play the audio data by retrieving the audio data from the optical disc 22, then the audio data can be transferred to the sound card connected to the optical disc player system 10, the audio digital data can be transferred to analog signal via DAC (Digital-to-analog converter), and the analog signal can be output via speaker connected to the sound card. As described above, the transition between higher spindle speed and lower spindle speed and transition time will cause the analog signal will be terminated temporarily and some kind intermittent sound outputted from the speaker.

In conclusion, the optical disc player system 10 of the prior art can't judge the action of instruction by the computer. Therefore, the optical disc player system 10 of the prior art still retrieves data (video/audio) from the optical disc 22 in the maximum spindle speed and the transition between higher spindle speed and lower spindle speed still results in low quality when playing a video disc or an audio disc.

SUMMARY OF INVENTION

The main objective of the present invention is to provide a method for controlling the data accessing rate of the optical disc player.

The present invention provides a method for controlling data accessing rate of an optical disc player in a computer system, that is, controlling data access rate of retrieving a predetermined track from an optical disc. The method comprises: utilizing the computer system of a host to execute a predetermined data processing, and output a plurality of instructions of data processing to the micro-controller; utilizing the micro-controller to decide whether action of an instruction of a predetermined data processing is an extraction operation or a play operation; controlling a spindle motor and a pick-up head to retrieve data from the optical disc at a first data access rate by the micro-controller while the action of the instruction of the predetermined data processing is an extraction operation; controlling the spindle motor and the pick-up head to retrieve data from the optical disc at a second data access rate which less than the first data access rate by the micro-controller while the action of the instruction of the predetermined data processing is a play operation; and transmitting digital data to the host which executes the predetermined data processing after retrieving the predetermined track from the optical disc.

These and other objectives of the present invention will no doubt become obvious to those of ordinary skill in the art after reading the following detailed description of the preferred embodiment that is illustrated in the various figures and drawings.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings, FIG. 1. is a schematic diagram of an optical disc player according to a prior art.

DETAILED DESCRIPTION

Referring to Table 1, it shows the setting rule of this invention for an audio disc and a non-audio disc, explained as follow:

(1) Audio Disc:

(a) Extraction operation: The count which the command gaps of instructions of data processing lower than the threshold 40 ms achieves more than 50 during a predetermined cycle, the action of the instruction of data processing is an extraction operation and the data access rate is set to 30×.

(b) Play operation: The count which the command gaps of instructions of data processing greater than the threshold 190 ms achieves more than 4 during a predetermined cycle, the action of the instruction of data processing is a play operation and the data access rate is set to 10×.

(2) Non-Audio Disc:

(a) Copy operation: The count which the command gaps of instructions of data processing lower than the threshold 40 ms achieves more than 200 during a predetermined cycle, the action of the instruction of data processing is a copy operation and the data access rate is set to 40×.

(b) Play operation: The count which the command gaps of instructions of data processing greater than the threshold 150 ms achieves more than 80 during a predetermined cycle, the action of the instruction of data processing is a play operation and the data access rate is set to 10×.

TABLE 1

The setting rule of the present invention

| Type of disc | Action | Rotation speed | Command gap (ms) | Count |
|---|---|---|---|---|
| Audio disc | Play | 10X | >190 | >4 |
|  | Extraction | 30X | <40 | >50 |
| Non-audio disc | Play | 10X | >150 | >80 |
|  | Copy | 40X | <40 | >200 |

In a first embodiment of the present invention, the optical disc player for the non-audio disc changes its rotation speed from a higher data access rate to a lower data access rate or keep the same rate, for example, the lower data access rate is 10× for playing the non-audio disc data.

Figure 1:
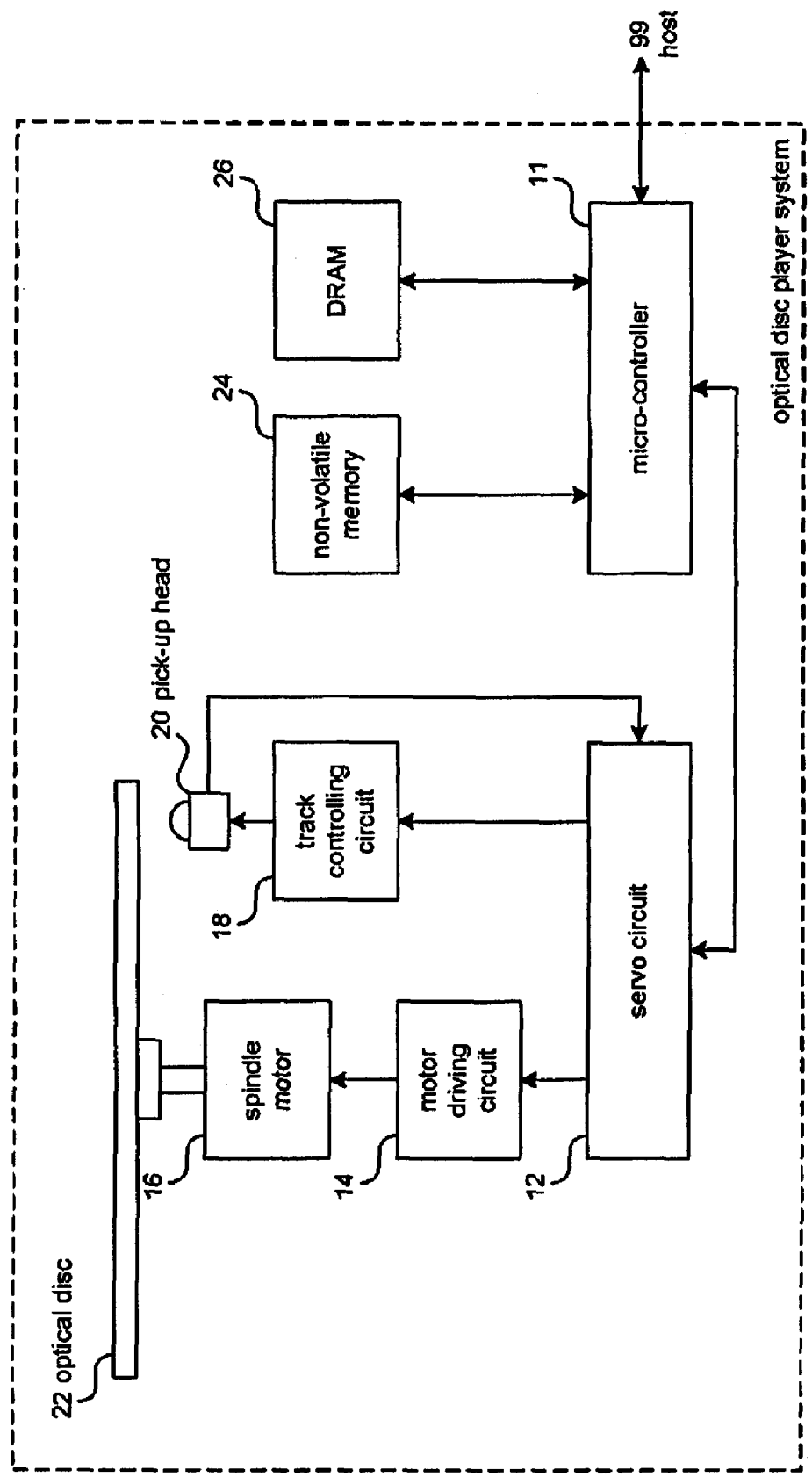
Figure 2:
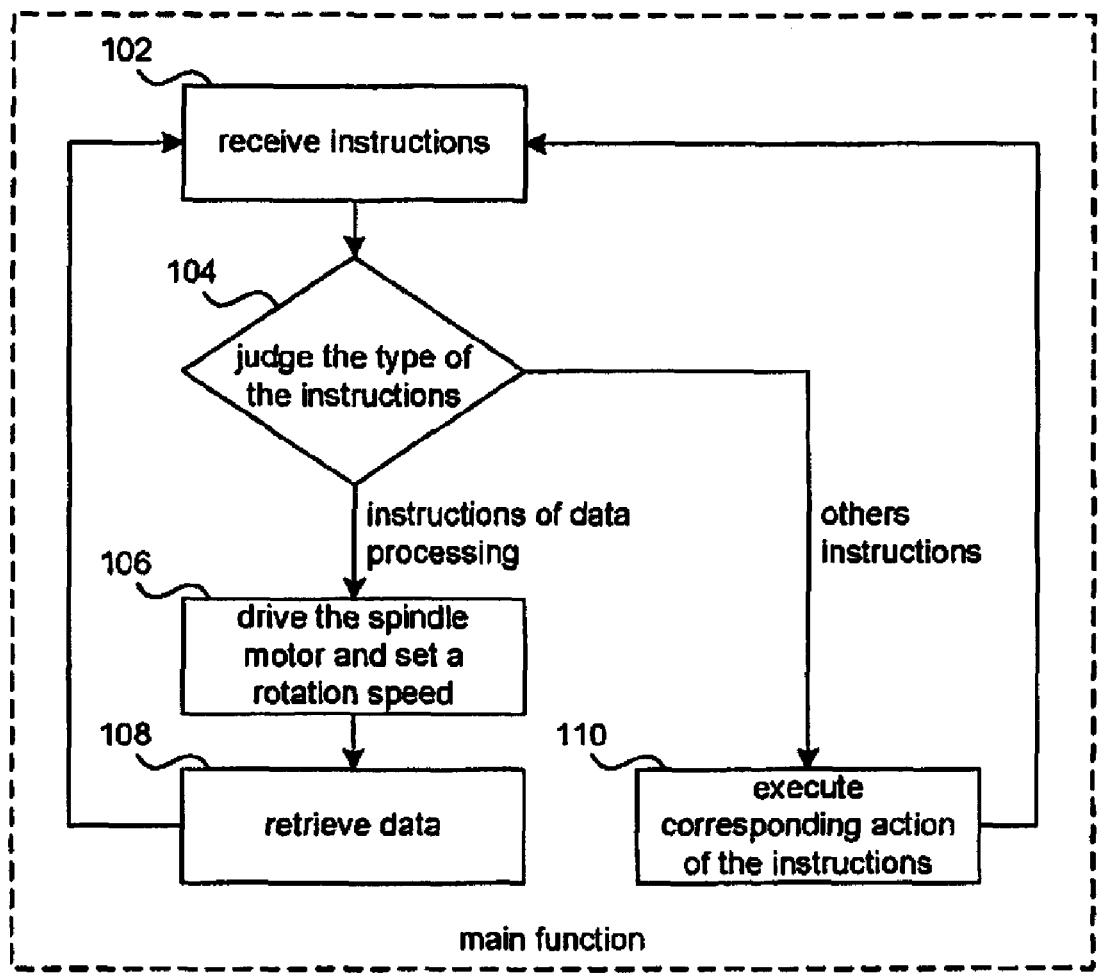
FIG. 2. is a flow chart of data retrieving of an optical disc retrieved by an optical disc player as shown in FIG. 1.
Figure 3:
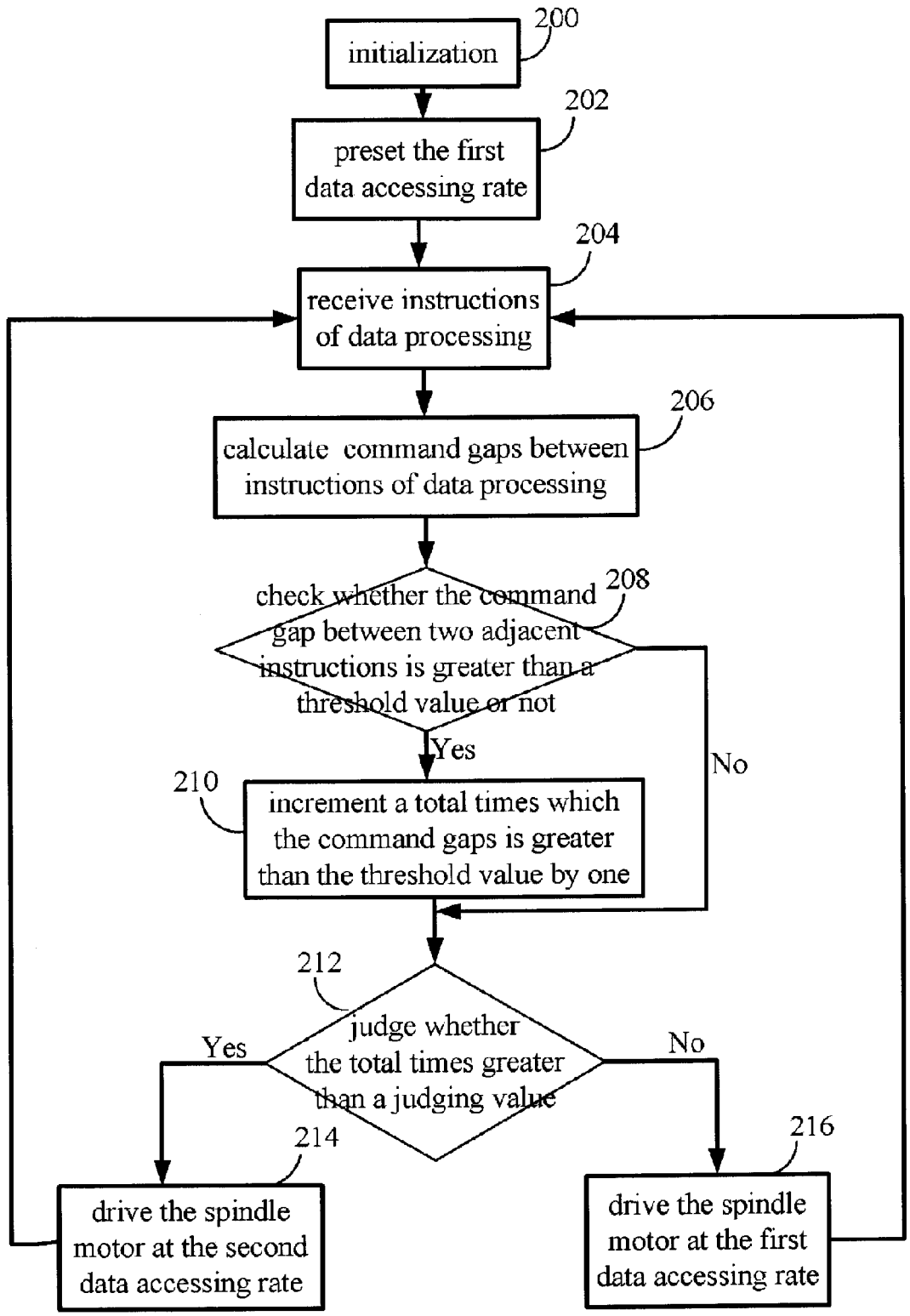
FIG. 3. is a first flow chart of this invention for controlling data accessing rate of the optical disc player.

Referring to FIG. 1. and FIG. 3, FIG. 3. is a first flow chart of this invention for controlling data access rate of the optical disc player, wherein a first data access rate is 40×, a second data access rate is 10×. The present invention for controlling data access rate of the optical disc player applies to the optical disc player system as shown in FIG. 1, therefore, no longer gives unnecessary detail in this. The present invention for controlling data access rate of the optical disc player, comprising the steps of:

Step 200: The optical disc player 10 initials in a working section to make enable itself.

Step 202: The optical disc player 10 presets the first data access rate (higher data access rate, for example 40×) to access data.

Step 204: The host outputs a polarity of instructions of data processing to the micro-controller 11 for retrieving the data from the optical disc 22; the optical disc player 10 processes each one in sequence.

Step 206: the micro-controller 11 executes the firmware of the optical disc player 10 and calculates continuously a polarity of command gaps between instructions of data processing.

Step 208: The micro-controller 11 checks whether the command gap between two adjacent instructions is larger than a threshold value or not; if yes, run step 210; if no, run step 212.

Step 210: The micro-controller 11 increments a total times which the command gap is greater than the threshold value by one during the predetermined cycle.

Step 212: The micro-controller 11 judges whether the total times greater than a judging value; if yes, the data processing is the play operation of the non-audio disc and run step 214; if no, run step 216.

Step 214: The micro-controller controls the spindle motor 16 via the servo circuit 12 in the second data access rate, for example 10×, to retrieve the data from the optical disc 22, wherein the second data access rate is lower than the first data access rate; run step 204 while accomplish the data accessing.

Step 216: The micro-controller controls the spindle motor 16 via the servo circuit 12 to maintain the first data access rate; run step 204 while accomplish the data accessing.

The detail of above is as follows. The optical disc player 10 initials in a working section to make enable itself, in one embodiment, the working section relates to power on until power off. In another embodiment, the working section relates to power on, load an optical disc into the optical disc player until unload the optical disc, power off. After initial, the micro-controller 11 sets the rotation speed of the spindle motor 16 via the servo circuit 12 to the corresponding highest speed supported by the optical disc player system 10, that is, the linear velocity of a predetermined track on the optical disc 22 corresponds to the first data access rate (step 202). A polarity of instructions of data processing outputted to the micro-controller 11 when the host wants to access the data of the optical disc 22, that is, the micro-controller 11 receives the instructions of data processing during a predetermined cycle to retrieve the data from the optical disc 22 (step 204), then the micro-controller 11 calculates continuously command gaps between instructions of data processing (step 206), judges whether each one command gap larger than the threshold (step 208), and counts the total times which the command gaps greater than the threshold during the predetermined cycle (step 210).

Considering the video disc, audio disc, or multi-media disc, when the host executes an application program to access the data of the optical disc 22, for example, copying the data of the optical disc 22 and store in a hard disc player, the instructions of data accessing for command the micro-controller 11 to drive the servo circuit 12 for controlling the pick-up head 20 to retrieve the data from the optical disc 22 and feedback to the host. The application program does not need to perform complicated process on the data. It only needs to control the storage of data into the hard disc player. Therefore, the command gaps between the continuous instructions of data accessing outputted from the host to the micro-controller 11 are short. For example, the command gaps are usually lower than 40 milliseconds. On the contrary, when the host executes an application program to play the data of the optical disc 22, for example, the application program retrieves the data from the optical disc 22, decodes the data, performs image processing, and outputs to a speaker or a monitor. It needs to consider the processing time for the calculation of the application program. Therefore, the command gaps between the continuous instructions of data accessing outputted from the host to the micro-controller 11 are long. For example, the command gaps are usually longer than 150 milliseconds.

As described above, the total times will be greater than a judging value when the host executes the application program to play the data of the optical disc 22. On the contrary, the total times will be lower than a judging value when the host executes the application program to retrieve the data from the optical disc 22 (step 212). Consequently, the micro-controller 11 controls the spindle motor 16 via the servo circuit 12 to operate in a lower rotation speed supported by the optical disc player 10, and make the linear velocity of the predetermined track on the optical disc 22 corresponds to the second data access rate when the total times will be greater than a judging value, wherein the second data access rate is lower than the first data access rate (step 214). In addition, the rotation speed of the spindle motor 16 need not change for keeping the linear velocity of the predetermined track on the optical disc 22 as the first data access rate (step 216).

In the first embodiment of the present invention, the command gaps between continuous instructions of data processing outputted by the host are greater than 150 milliseconds when playing the video data. However, the command gaps between continuous instructions of data processing outputted by the host are greater than 190 milliseconds when playing the audio data. Therefore, for the video disc in this embodiment, the micro-controller 11 counts the command gaps greater than 150 milliseconds and judges whether these command gaps are more than 65 during 30 seconds in steps 208-212. For the audio disc in this embodiment, the micro-controller 11 counts the command gaps greater than 190 milliseconds and judges whether these command gaps are more than 4 during 1.5 seconds in steps 208-212. For this reason, the micro-controller 11 can decide the application program plays the video data or the audio data. Furthermore, the application program can retrieve the data in the second data access rate to avoid low quality of playing caused by the change of the rotation speed of the spindle motor used as habit. In addition, this embodiment cannot only applied to an optical disc player with constant linear velocity architecture but also an optical disc player with constant angular velocity architecture.

In a second embodiment of the present invention, an optical disc player for the non-audio disc changes its rotation speed from a higher data access rate to another higher data access rate or keep the same rate, for example, the another higher data access rate is 40× for copying the non-audio disc data.

Figure 4:
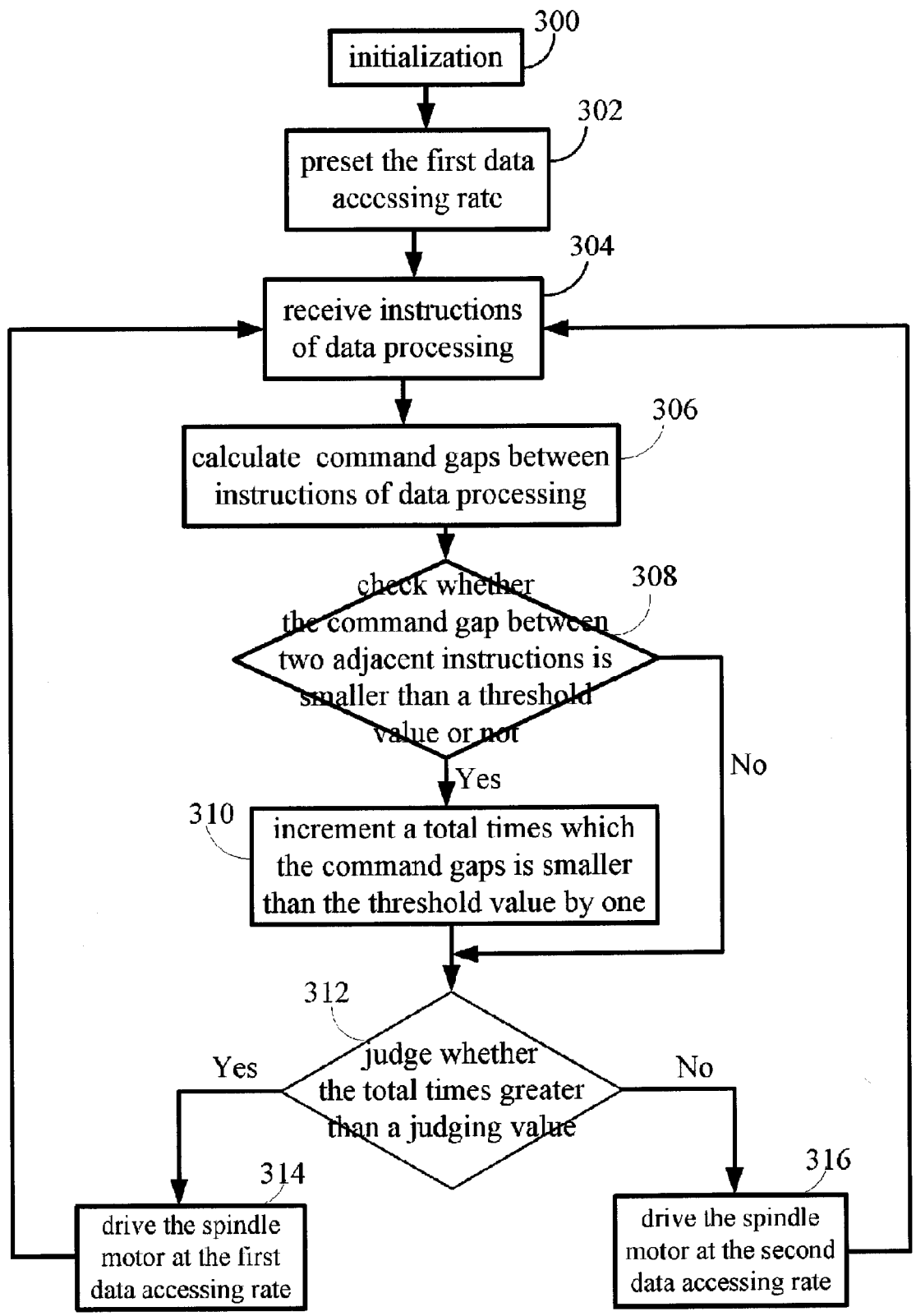
FIG. 4. is a second flow chart of this invention for controlling data accessing rate of the optical disc player.

Referring to FIG. 1. and FIG. 4, FIG. 4. is a second flow chart of this invention for controlling data access rate of the optical disc player. The present invention for controlling data access rate of the optical disc player, comprising the steps of:

Step 300: The optical disc player 10 initials in a working section to make enable itself.

Step 302: The optical disc player 10 presets a first data access rate to access data.

Step 304: The host outputs a polarity of instructions of data processing to the micro-controller 11 for retrieving the data from the optical disc 22; the optical disc player 10 processes each one in sequence.

Step 306: the micro-controller 11 executes the firmware of the optical disc player 10 and calculates continuously a polarity of command gaps between instructions of data processing.

Step 308: The micro-controller 11 checks whether the command gap between two adjacent instructions is lower than a threshold value or not; if yes, run step 310; if no, run step 312.

Step 310: The micro-controller 11 increments a total times which the command gap is smaller than the threshold value by one during the predetermined cycle.

Step 312: The micro-controller 11 judges whether the total times greater than a judging value; if yes, run step 314; if no, run step 316.

Step 314: The micro-controller controls the spindle motor 16 via the servo circuit 12 to maintain the first data access rate; run step 304 while accomplish the data accessing.

Step 316: The micro-controller controls the spindle motor 16 via the servo circuit 12 in the second data access rate to retrieve the data from the optical disc 22, wherein the second data access rate is higher than the first data access rate; run step 304 while accomplish the data accessing.

The steps described above are similar to the flow shown in FIG. 3. The main difference is in steps 308-310, and the micro-controller 11 counts the total times that the command gaps lower than the threshold during the predetermined cycle. For the video disc, the total times will be larger than a judging value when the host executes the application program to extract data from the video disc, for example, copy the data and store the data in a hard-disc player (step 312). In this situation, the rotation speed of the spindle motor 16 does not need to adjust, but keep the linear velocity of the predetermined track on the optical disc 22 as the first data access rate (step 314). On the contrary, the total times will be lower than a judging value when the host executes the application program to play data from the video disc (step 312), and the micro-controller 11 controls the spindle motor 16 via the servo circuit 12 to operate in a lower rotation speed supported by the optical disc player 10, and make the linear velocity of the predetermined track on the optical disc 22 corresponds to a second data access rate (step 316), wherein the second data access rate is lower than the first data access rate.

In the second embodiment of the present invention, the command gaps between continuous instructions of data processing outputted by the host are lower than 150 milliseconds when playing the video data. However, the command gaps between continuous instructions of data processing outputted by the host are lower than 190 milliseconds when playing the audio data. Therefore, for the video disc in this embodiment, the micro-controller 11 counts the command gaps greater than 150 milliseconds and judges whether these command gaps are more than 65 during 30 seconds in steps 208-212. For the audio disc in this embodiment, the micro-controller 11 counts the command gaps greater than 190 milliseconds and judges whether these command gaps are more than 4 during 1.5 seconds in steps 208-212. For this reason, the micro-controller 11 can decide the application program plays the video data or the audio data. Furthermore, the application program can retrieve the data in the second data access rate to avoid low quality of playing caused by the change of the rotation speed of the spindle motor used as habit. In addition, this embodiment cannot only applied to an optical disc player with constant linear velocity architecture but also an optical disc player with constant angular velocity architecture.

In a third embodiment of the present invention, an optical disc player for the audio disc changes its rotation speed from a lower data access rate to another lower data access rate or keep the same rate, for example, the lower data access rate is 10× for retrieving the audio disc data.

Figure 5:
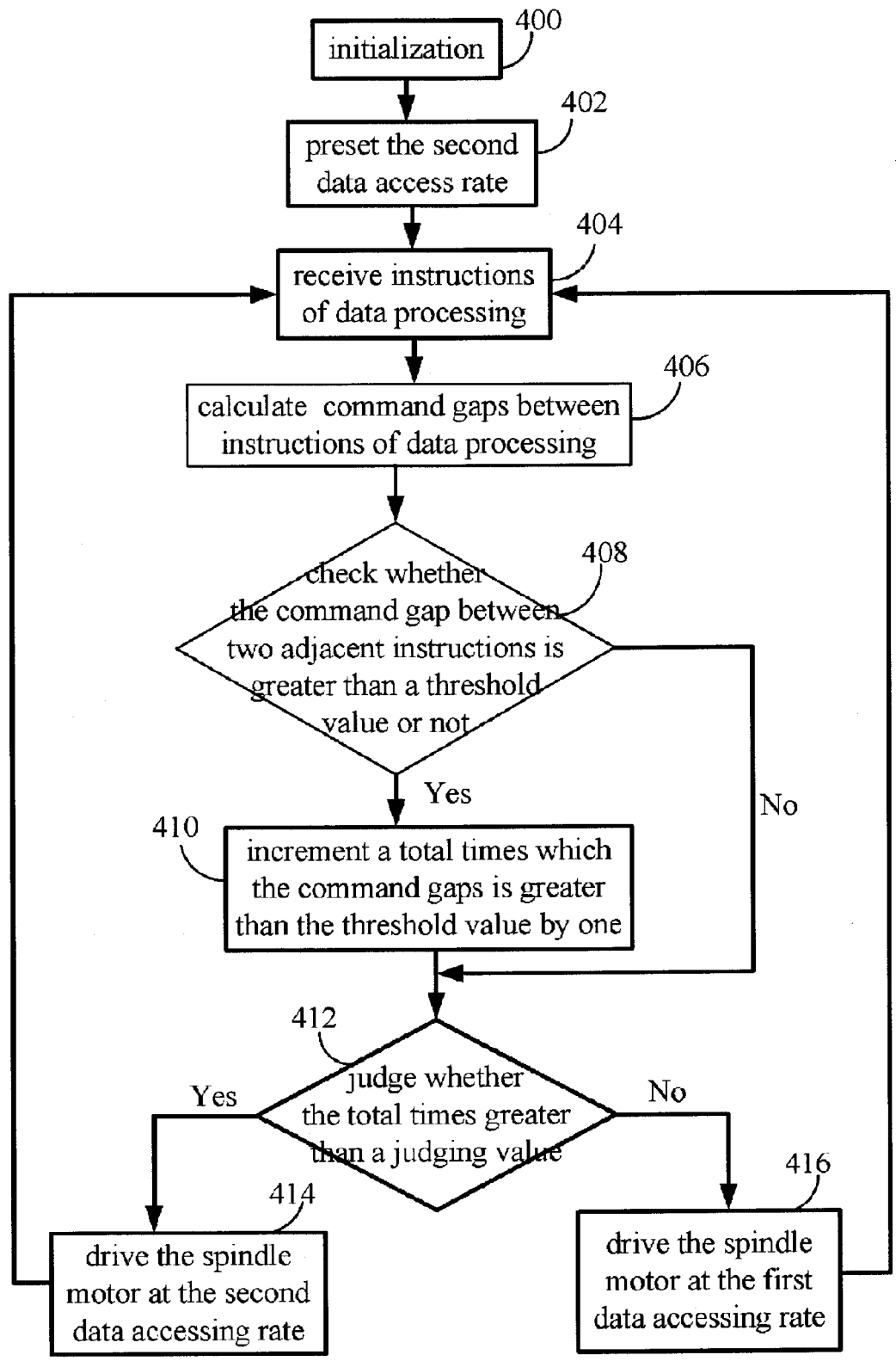
FIG. 5. is a third flow chart of this invention for controlling data accessing rate of the optical disc player.

Referring to FIG. 1, FIG. 3 and FIG. 5. FIG. 5. is a third flow chart of this invention for controlling data access rate of the optical disc player. The present invention for controlling data access rate of the optical disc player, comprising the steps of:

Step 400: The optical disc player 10 initials in a working section to make enable itself.

Step 402: The optical disc player 10 presets a second data access rate to access data.

Step 404: The host outputs a polarity of instructions of data processing to the micro-controller 11 for retrieving the data from the optical disc 22; the optical disc player 10 processes each one in sequence.

Step 406: the micro-controller 11 executes the firmware of the optical disc player 10 and calculates continuously a polarity of command gaps between instructions of data processing.

Step 408: The micro-controller 11 checks whether the command gap between two adjacent instructions is greater than a threshold value or not; if yes, run step 410; if no, run step 412.

Step 410: The micro-controller 11 increments a total times which the command gap is greater than the threshold value by one during the predetermined cycle.

Step 412: The micro-controller 11 judges whether the total times greater than a judging value; if yes, run step 414; if no, run step 416.

Step 414: The micro-controller controls the spindle motor 16 via the servo circuit 12 to maintain the second data access rate; run step 404 while accomplish the data accessing.

Step 416: The micro-controller controls the spindle motor 16 via the servo circuit 12 in a first data access rate to retrieve the data from the optical disc 22, wherein the first data access rate is greater than the second data access rate; run step 404 while accomplish the data accessing.

The steps described above are similar to the flow shown in FIG. 3. However, a default data access rate is the second data access rate that is the lower data access rate in the flow shown in FIG. 5. The spindle motor 16 starts to speed the spindle up, which causes that the linear velocity of the predetermined track on the optical disc 22 corresponds to the second data access rate. Therefore, the total times is not greater than the judging value (step 410) when the host executes the application program to extract the audio data of the optical disc 22, and the micro-controller 11 controls the motor driving circuit 14 via the servo circuit 12 to make the spindle motor 16 operates in a higher rotation speed supported by the optical disc player system 10. It causes that the linear velocity of the predetermined track on the optical disc 22 corresponds to the first data access rate (step 416), wherein the first data access rate is greater than the second data access rate. In addition, the rotation speed of the spindle motor 16 need not change and keeps the second data access rate when the total times is greater than the judging value (step 414).

In the third embodiment of the present invention, the command gaps between continuous instructions of data processing outputted by the host are smaller than 40 milliseconds when extracting the audio data. Therefore, for the audio disc in this embodiment, the micro-controller 11 counts the command gaps greater than 190 milliseconds and judges whether these command gaps are more than 4 during 1.5 seconds in steps 408-412. For this reason, the micro-controller 11 can decide the application program plays or extracts the audio data. Furthermore, the application program can retrieve the data by keeping the second data access rate to avoid low quality of playing caused by the change of the rotation speed of the spindle motor used as habit. In addition, this embodiment cannot only applied to an optical disc player with constant linear velocity architecture but also an optical disc player with constant angular velocity architecture.

In a forth embodiment of the present invention, an optical disc player for the audio disc changes its rotation speed from a lower data access rate to a higher data access rate or keep the same rate, for example, the higher data access rate is 30× for retrieving the audio disc data.

Figure 6:
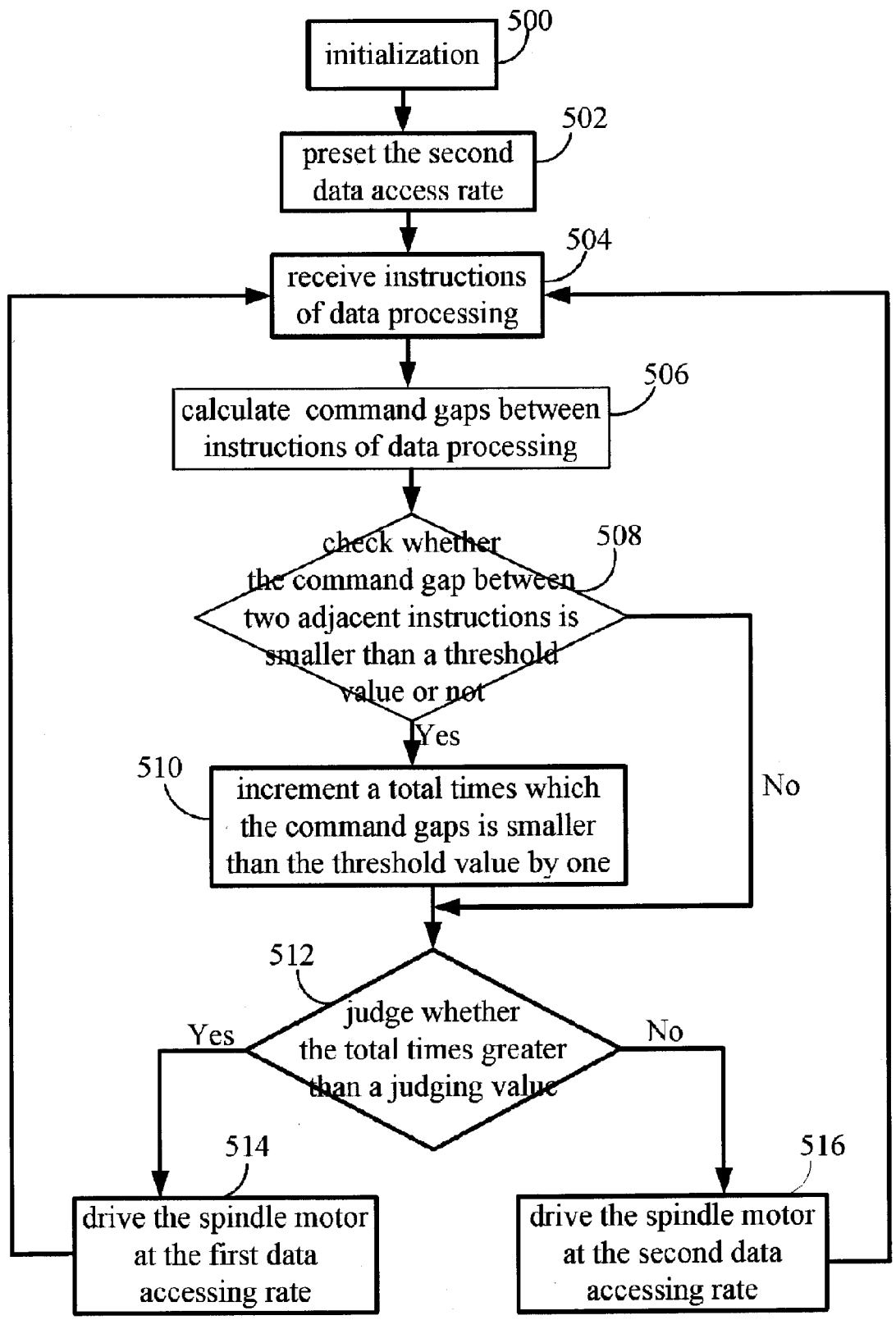
FIG. 6. is a fourth flow chart of this invention for controlling data accessing rate of the optical disc player.

Referring to FIG. 1, FIG. 5 and FIG. 6. FIG. 6. is a forth flow chart of this invention for controlling data access rate of the optical disc player. The present invention for controlling data access rate of the optical disc player, comprising the steps of:

Step 500: The optical disc player 10 initials in a working section to make enable itself.

Step 502: The optical disc player 10 presets a second data access rate to access data.

Step 504: The host outputs a polarity of instructions of data processing to the micro-controller 11 for retrieving the data from the optical disc 22; the optical disc player 10 processes each one in sequence.

Step 506: the micro-controller 11 executes the firmware of the optical disc player 10 and calculates continuously a polarity of command gaps between instructions of data processing.

Step 508: The micro-controller 11 checks whether the command gap between two adjacent instructions is smaller than a threshold value or not; if yes, run step 510; if no, run step 512.

Step 510: The micro-controller 11 increments a total times which the command gap is smaller than the threshold value by one during the predetermined cycle.

Step 512: The micro-controller 11 judges whether the total times greater than a judging value; if yes, run step 514; if no, run step 516.

Step 514: The micro-controller controls the spindle motor 16 via the servo circuit 12 in a first data access rate to retrieve the data from the optical disc 22, wherein the first data access rate is greater than the second data access rate; run step 504 while accomplish the data accessing.

Step 516: The micro-controller controls the spindle motor 16 via the servo circuit 12 to maintain the second data access rate; run step 504 while accomplish the data accessing.

The steps described above are similar to the flow shown in FIG. 5. The spindle motor 16 starts to speed the spindle up, which causes that the linear velocity of the predetermined track on the optical disc 22 corresponds to the second data access rate. Therefore, the total times is not greater than the judging value (step 510) when the host executes the application program to extract the audio data of the optical disc 22, and the micro-controller 11 controls the motor driving circuit 14 via the servo circuit 12 to make the spindle motor 16 operates in a higher rotation speed supported by the optical disc player system 10. It causes that the linear velocity of the predetermined track on the optical disc 22 corresponds to the first data access rate (step 514), wherein the first data access rate is greater than the second data access rate. In addition, the rotation speed of the spindle motor 16 need not change and keeps the second data access rate when the total times is smaller than the judging value (step 516).

In the forth embodiment of the present invention, the command gaps between continuous instructions of data processing outputted by the host are smaller than 40 milliseconds when extracting the audio data. Therefore, for the audio disc in this embodiment, the micro-controller 11 counts the command gaps greater than 190 milliseconds and judges whether these command gaps are more than 4 during 1.5 seconds in steps 508-512. For this reason, the micro-controller 11 can decide the application program plays or extracts the audio data. Furthermore, the application program can retrieve the data by keeping the second data access rate to avoid low quality of playing caused by the change of the rotation speed of the spindle motor used as habit. In addition, this embodiment cannot only applied to an optical disc player with constant linear velocity architecture but also an optical disc player with constant angular velocity architecture.

In a fifth embodiment of the present invention, an optical disc player changes its rotation speed from a higher data access rate to a lower data access rate or keep the same rate.

Figure 7:
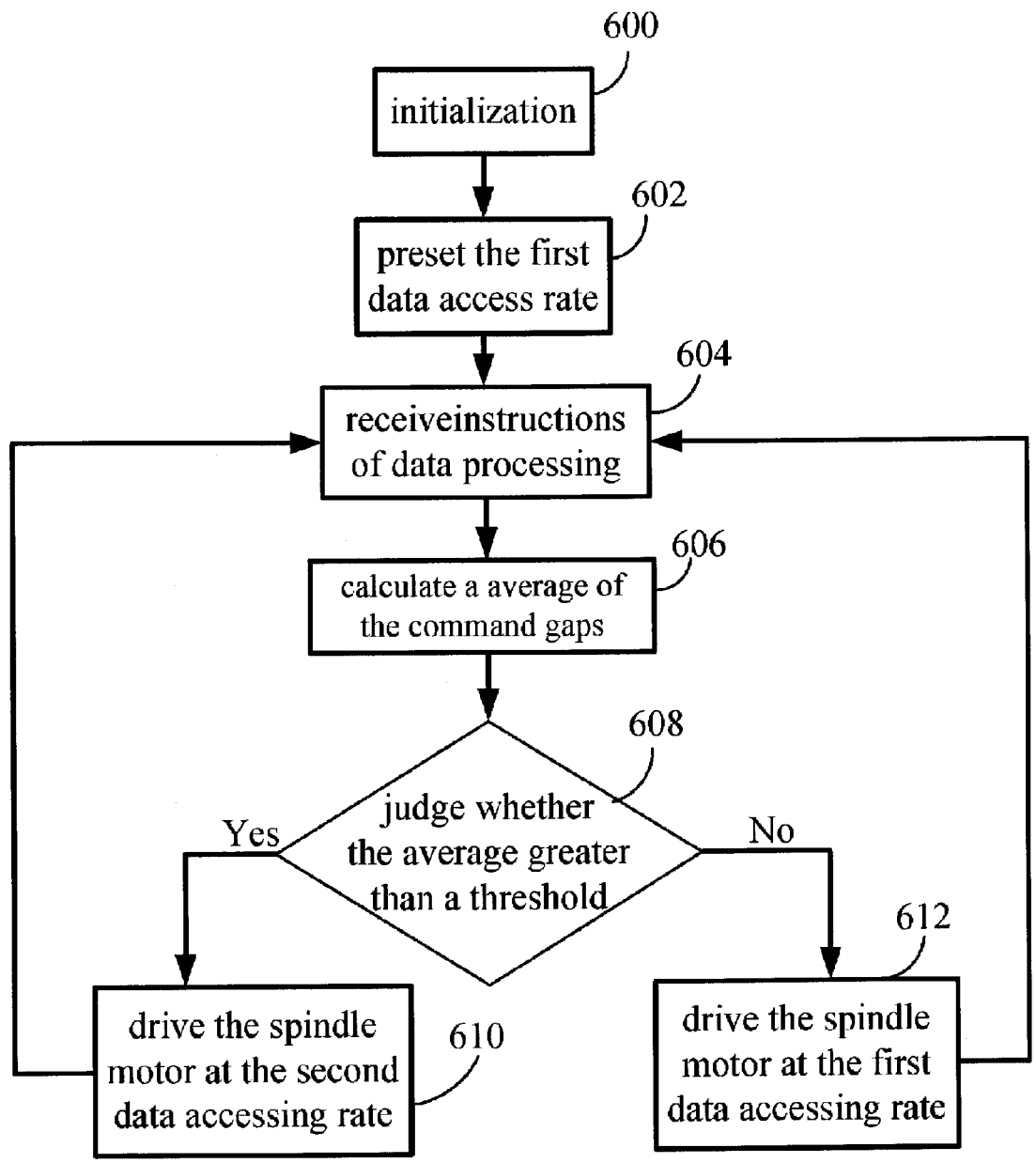
FIG. 7. is a fifth flow chart of this invention for controlling data accessing rate of the optical disc player.

Referring to FIG. 1. and FIG. 7. FIG. 7. is a fifth flow chart of this invention for controlling data access rate of the optical disc player. The present invention for controlling data access rate of the optical disc player, comprising the steps of:

Step 600: The optical disc player 10 initials in a working section to make enable itself.

Step 602: The optical disc player 10 presets a first data access rate to access data.

Step 604: The host outputs a polarity of instructions of data processing to the micro-controller 11 for retrieving the data from the optical disc 22; the optical disc player 10 processes each one in sequence.

Step 606: the micro-controller 11 executes the firmware of the optical disc player 10, calculates continuously a polarity of command gaps between instructions of data processing and gets an average of the command gaps during a predetermined cycle.

Step 608: The micro-controller 11 judges whether the average greater than a judging value; if yes, run step 610; if no, run step 612.

Step 610: The micro-controller controls the spindle motor 16 via the servo circuit 12 in a second data access rate to retrieve the data from the optical disc 22, wherein the second data access rate is smaller than the first data access rate; run step 604 while accomplish the data accessing.

Step 612: The micro-controller controls the spindle motor 16 via the servo circuit 12 to maintain the first data access rate; run step 604 while accomplish the data accessing.

The details of above steps are as follows: The micro-controller 11 sets the spindle motor 16 via the servo circuit 12 the higher rotation speed supported by the optical disc player system 10, which causes that the linear velocity of the predetermined track on the optical disc 22 corresponds to the first data access rate (step 602). The micro-controller 11 receives a polarity of instructions of data accessing (step 604) when the host executes the application program to access the data of the optical disc 22, and calculates continuously a polarity of command gaps between instructions of data processing and gets an average of the command gaps during a predetermined cycle (step 606). Then, the average of the command gaps is greater than a judging value when the application program executed by the host plays the data of the optical disc. The average of the command gaps, however, is smaller than the judging value when the application program executed by the host extracts the data of the optical disc (step 608). Therefore, the micro-controller 11 controls the motor driving circuit 14 via the servo circuit 12 to make the spindle motor 16 operates in a lower rotation speed supported by the optical disc player system 10 when the average is greater than the judging value. It causes that the linear velocity of the predetermined track on the optical disc 22 corresponds to the second data access rate (step 610), wherein the second data access rate is lower than the first data access rate. In addition, the rotation speed of the spindle motor 16 need not change and keeps the first data access rate when the average is smaller than the judging value (step 612). And this embodiment cannot only applied to an optical disc player with constant linear velocity architecture but also an optical disc player with constant angular velocity architecture.

In a sixth embodiment of the present invention, an optical disc player changes its rotation speed from a lower data access rate to another lower data access rate or keep the same rate.

Figure 8:
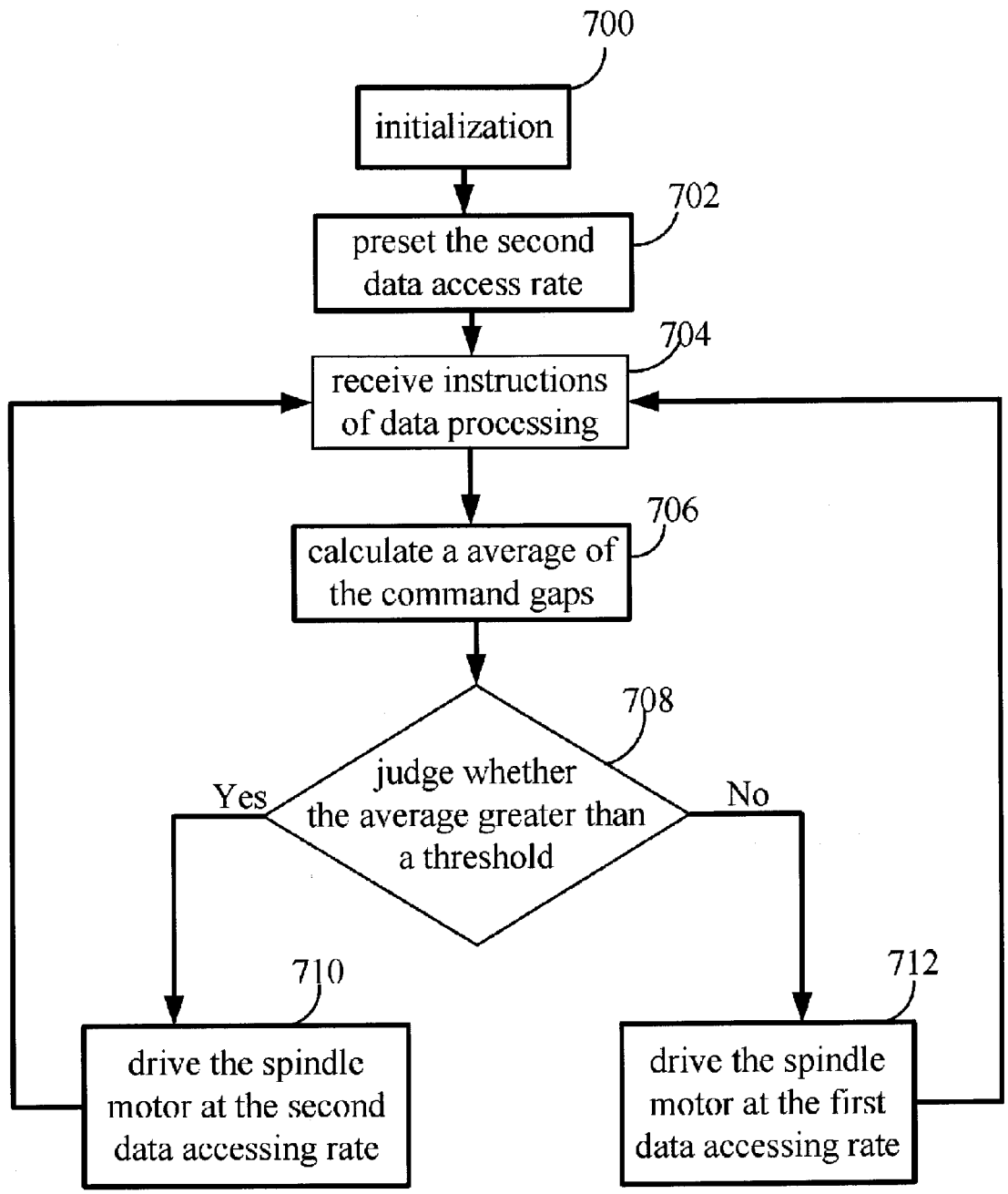
FIG. 8. is a sixth flow chart of this invention for controlling data accessing rate of the optical disc player.

Referring to FIG. 1, FIG. 7. and FIG. 8. FIG. 8. is a sixth flow chart of this invention for controlling data access rate of the optical disc player. The present invention for controlling data access rate of the optical disc player, comprising the steps of:

Step 700: The optical disc player 10 initials in a working section to make enable itself.

Step 702: The optical disc player 10 presets a second data access rate to access data.

Step 704: The host outputs a polarity of instructions of data processing to the micro-controller 11 for retrieving the data from the optical disc 22; the optical disc player 10 processes each one in sequence.

Step 706: the micro-controller 11 executes the firmware of the optical disc player 10, calculates continuously a polarity of command gaps between instructions of data processing and gets an average of the command gaps during a predetermined cycle.

Step 708: The micro-controller 11 judges whether the average greater than a judging value; if yes, run step 710; if no, run step 712.

Step 710: The micro-controller controls the spindle motor 16 via the servo circuit 12 to maintain the second data access rate; run step 704 while accomplish the data accessing.

Step 712: The micro-controller controls the spindle motor 16 via the servo circuit 12 in a first data access rate to retrieve the data from the optical disc 22, wherein the first data access rate is greater than the second data access rate; run step 704 while accomplish the data accessing.

The steps described above are similar to the flow shown in FIG. 7. However, a default data access rate is the second data access rate that is the lower data access rate in the flow shown in FIG. 8. The spindle motor 16 starts to speed the spindle up, which causes that the linear velocity of the predetermined track on the optical disc 22 corresponds to the second data access rate. Therefore, the average is greater than the judging value (step 706) when the host executes the application program to extract the audio data or the video data, and the rotation speed of the spindle motor 16 need not change and keeps the second data access rate when the total times is greater than the judging value (step 710). On the contrary, the micro-controller 11 controls the motor driving circuit 14 via the servo circuit 12 to make the spindle motor 16 operates in a higher rotation speed supported by the optical disc player system 10 when the application program executed by the host just extracts the data of the optical disc. It causes that the linear velocity of the predetermined track on the optical disc 22 corresponds to the first data access rate (step 712), wherein the first data access rate is greater than the second data access rate. In addition, this embodiment cannot only applied to an optical disc player with constant linear velocity architecture but also an optical disc player with constant angular velocity architecture.

The present invention relates to a method for controlling the data access rate of an optical disc player. Comparing with the prior art, this invention comprises the steps of: judging whether a data processing executed by an application program is an extraction operation or a play operation, driving linear velocity of a predetermined track to correspond to a higher data access rate by a spindle motor when the data processing is the extraction operation, and driving linear velocity of a predetermined track to correspond to a lower data access rate by the spindle motor when the data processing is the play operation. Therefore, the rotation speed of the spindle motor does not switch as frequent as the prior art when a user executes the application program of a host to play the video data or the audio data of the optical disc, and the pick-up head can retrieve the data from the optical disc stably. In other words, the present invention for controlling the data access rate of an optical disc player causes better performance when operation of the optical disc player is playing, further gives the competitive advantage.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for controlling a data access rate of an optical disc player utilizing a micro-controller to control data access rate, comprising:

computing a plurality of command gaps of instructions received from a host, calculating an average value of the command gaps;

comparing the average value with a judging value, said comparing including:

calculating a plurality of command gaps of instructions outputted to the optical disc player from the host, comparing the plurality of command gaps against a threshold to identify a total number of times the command gaps are lesser than the threshold during a predetermined cycle;

identifying that the received instructions indicate a play operation when the average value is greater than the judging value, said identifying including comparing the total number of times with the judging value and identifying that the received instructions indicate the play operation when the total number of times is greater than the judging value;

otherwise, identifying that the received instructions indicate an extraction operation; and controlling a spindle motor and a pick-up head at a specific data access rate based on the identified operation.

2. The method of claim 1, wherein identifying whether the received instructions indicate either the extraction operation or the plan operation further comprises:

calculating a plurality of command gaps of instructions of data processing outputted to the optical disc player by the host; and calculating an average value of the command gaps during a predetermined cycle.

3. The method of claim 2, further comprising:

comparing the average value with a judging value, and identifying that the received instructions indicate the play operation when the average value is greater than the judging value;

otherwise, identifying that the received instructions indicate the extraction operation.

4. A method for adjusting a data access rate of retrieving data from an optical disc by an optical disc player, comprising:

measuring each command gap between adjacent instructions of data processing;

judging an action of the instructions of data processing of the optical disc player by a predetermined rule, wherein the predetermined rule is to judge the action of the instructions of data processing based on the command gaps, said judging including:

measuring a first count of a number of command gaps that are greater than a first threshold during a predetermined cycle;

measuring a second count of a number of command gaps that are lesser than a second threshold during a predetermined cycle; and presetting a first area for definition of the play operation and a second area for definition of the extraction operation in a coordinate axis, wherein the predetermined rule judges the action of the instructions of data processing according to a relation of the command gaps, the first count, and the second count, wherein the setting range of the first threshold is approximately between 120 ms and 170 ms and the setting range of the first count is approximately between 10 and 70;

judging the action of instructions of data processing to be the play operation when the first threshold and the first count are located in the first area; and adjusting the data access rate of optical disc player according to the action of the instructions of data processing, wherein adjusting the data access rate includes controlling the optical disc player to retrieve data from the optical disc at a first data access rate when the action of the instruction is an extraction operation, and controlling the optical disc player to retrieve data from the optical disc at a second data access rate when the action of the instruction is a play operation.

5. The method of claim 1, wherein the specific data access rate is indicative of a rate of receiving a track from an optical disc.

6. The method of claim 1, further comprising:

controlling the spindle motor and the pick-up head to retrieve data from an optical disc at a first data access rate when the received instructions indicate the extraction operation;

otherwise, controlling the spindle motor and the pick-up head to retrieve data from the optical disc at a second data access rate when the received instructions indicate the play operation, wherein the second data access rate is lesser than the first data access rate.

7. The method of claim 4, wherein a value of the second data access rate is lesser than a value of the first access rate.

8. A method for controlling a data access rate of an optical disc player utilizing a micro-controller to control data access rate, comprising:

computing a plurality of command gaps of instructions received from a host, calculating an average value of the command gaps;

comparing the average value with a judging value, said comparing including:

calculating a plurality of command gaps of instructions outputted to the optical disc player from the host;

comparing the plurality of command gaps against a threshold to identify a total number of times the command gaps are lesser than the threshold during a predetermined cycle;

identifying that the received instructions indicate a play operation when the average value is greater than the judging value, said identifying including comparing the total number of times with the judging value and identifying that the received instructions indicate the play operation when the total number of times is lesser than the judging value;

otherwise, identifying that the received instructions indicate an extraction operation; and controlling a spindle motor and a pick-up head at a specific data access rate based on the identified operation.

9. A method for adjusting a data access rate of retrieving data from an optical disc by an optical disc player, comprising:

measuring each command gap between adjacent instructions of data processing;

judging an action of the instructions of data processing of the optical disc player by a predetermined rule, wherein the predetermined rule is to judge the action of the instructions of data processing based on the command gaps, said judging including:

measuring a first count of a number of command gaps that are greater than a first threshold during a predetermined cycle;

measuring a second count of a number of command gaps that are lesser than a second threshold during a predetermined cycle; and presetting a first area for definition of the play operation and a second area for definition of the extraction operation in a coordinate axis, wherein the predetermined rule judges the action of the instructions of data processing according to a relation of the command gaps, the first count, and the second count, wherein the setting range of the first threshold is approximately between 130 ms and 200 ms and the setting range of the first count is approximately between 50 and 110;

judging the action of instructions of data processing to be the extraction operation when the second threshold and the second count are located in the second area; and adjusting the data access rate of optical disc player according to the action of the instructions of data processing, wherein adjusting the data access rate includes controlling the optical disc player to retrieve data from the optical disc at a first data access rate when the action of the instruction is an extraction operation, and controlling the optical disc player to retrieve data from the optical disc at a second data access rate when the action of the instruction is a play operation.

10. A method for adjusting a data access rate of retrieving data from an optical disc by an optical disc player, comprising:

measuring each command gap between adjacent instructions of data processing;

judging an action of the instructions of data processing of the optical disc player by a predetermined rule, wherein the predetermined rule is to judge the action of the instructions of data processing based on the command gaps, said judging including:

measuring a first count of a number of command gaps that are greater than a first threshold during a predetermined cycle;

measuring a second count of a number of command gaps that are lesser than a second threshold during a predetermined cycle; and presetting a first area for definition of the play operation and a second area for definition of the extraction operation in a coordinate axis, wherein the predetermined rule judges the action of the instructions of data processing according to a relation of the command gaps, the first count, and the second count, wherein the setting range of the second threshold is approximately between 10 ms and 45 ms, and the setting range of the first count is approximately between 40 and 80;

judging the action of instructions of data processing to be the play operation when the first threshold and the first count are located in the first area; and adjusting the data access rate of optical disc player according to the action of the instructions of data processing, wherein adjusting the data access rate includes controlling the optical disc player to retrieve data from the optical disc at a first data access rate when the action of the instruction is an extraction operation, and controlling the optical disc player to retrieve data from the optical disc at a second data access rate when the action of the instruction is a play operation.

11. A method for adjusting a data access rate of retrieving data from an optical disc by an optical disc player, comprising:

measuring each command gap between adjacent instructions of data processing;

judging an action of the instructions of data processing of the optical disc player by a predetermined rule, wherein the predetermined rule is to judge the action of the instructions of data processing based on the command gaps, said judging including:

measuring a first count of a number of command gaps that are greater than a first threshold during a predetermined cycle;

measuring a second count of a number of command gaps that are lesser than a second threshold during a predetermined cycle; and presetting a first area for definition of the play operation and a second area for definition of the extraction operation in a coordinate axis, wherein the predetermined rule judges the action of the instructions of data processing according to a relation of the command gaps, the first count, and the second count, wherein the setting range of the second threshold is approximately between 10 ms and 45 ms, and the setting range of the first count is approximately between 180 and 300;

judging the action of instructions of data processing to be the play operation when the first threshold and the first count are located in the first area; and adjusting the data access rate of optical disc player according to the action of the instructions of data processing, wherein adjusting the data access rate includes controlling the optical disc player to retrieve data from the optical disc at a first data access rate when the action of the instruction is an extraction operation, and controlling the optical disc player to retrieve data from the optical disc at a second data access rate when the action of the instruction is a play operation.

* * * * *

UNITED STATES PATENT AND TRADEMARK OFFICE
CERTIFICATE OF CORRECTION

| | | |
|---|---|---|
| PATENT NO. | : 8,228,766 B2 | |
| APPLICATION NO. | : 12/773198 | |
| DATED | : July 24, 2012 | |
| INVENTOR(S) | : Lin | |

It is certified that error appears in the above-identified patent and that said Letters Patent is hereby corrected as shown below:

On the Title Page, in the Figure, for Tag "210", in Line 2, delete "gaps" and insert -- gap --, therefor.

On the Title Page, in the Figure, for Tag "310", in Line 2, delete "gaps" and insert -- gap --, therefor.

In Fig. 3, Sheet 3 of 8, for Tag "210", in Line 2, delete "gaps" and insert -- gap --, therefor.

In Fig. 4, Sheet 4 of 8, for Tag "310", in Line 2, delete "gaps" and insert -- gap --, therefor.

In Fig. 5, Sheet 5 of 8, for Tag "410", in Line 2, delete "gaps" and insert -- gap --, therefor.

In Fig. 6, Sheet 6 of 8, for Tag "510", in Line 2, delete "gaps" and insert -- gap --, therefor.

In Fig. 7, Sheet 7 of 8, for Tag "604", in Line 1, delete "receiveinstructions" and insert -- receive instructions --, therefor.

In Column 3, Line 2, delete "recovery" and insert -- recover --, therefor.

In Column 4, Line 30, delete "drawings," and insert -- drawings: --, therefor.

In Column 4, Line 52, delete "follow:" and insert -- follows: --, therefor.

In Column 5, Line 25, delete "FIG. 1. and FIG. 3, FIG. 3. is" and insert -- FIG. 1 and FIG. 3, FIG. 3 is --, therefor.

In Column 7, Line 21, delete "FIG. 1. and FIG. 4, FIG. 4. is" and insert -- FIG. 1 and FIG. 4, FIG. 4 is --, therefor.

In Column 8, Line 34, delete "FIG. 1, FIG. 3 and FIG. 5. FIG. 5. is" and insert -- FIG. 1, FIG. 3 and FIG. 5, FIG. 5 is --, therefor.

Signed and Sealed this
Fifteenth Day of January, 2013

David J. Kappos
*Director of the United States Patent and Trademark Office*

CERTIFICATE OF CORRECTION (continued)
U.S. Pat. No. 8,228,766 B2

In Column 9, Line 42, delete "and FIG. 6. FIG. 6. is" and insert -- and FIG. 6, FIG. 6 is --, therefor.

In Column 10, Line 45, delete "FIG. 1. and FIG. 7. FIG. 7. is" and insert
-- FIG. 1 and FIG. 7, FIG. 7 is --, therefor.

In Column 11, Line 41, delete "FIG. 7. and FIG. 8. FIG. 8. is" and insert
-- FIG. 7 and FIG. 8, FIG. 8 is --, therefor.

In Column 12, Line 61, in Claim 1, delete "host," and insert -- host; --, therefor.